US008601433B2

(12) United States Patent
Son et al.

(10) Patent No.: US 8,601,433 B2
(45) Date of Patent: Dec. 3, 2013

(54) METHOD AND APPARATUS FOR GENERATING VIRTUAL SOFTWARE PLATFORM BASED ON COMPONENT MODEL AND VALIDATING SOFTWARE PLATFORM ARCHITECTURE USING THE PLATFORM

(75) Inventors: Kyoung-ho Son, Suwon-si (KR); Ja-gun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1273 days.

(21) Appl. No.: 12/241,553

(22) Filed: Sep. 30, 2008

(65) Prior Publication Data
US 2009/0210858 A1    Aug. 20, 2009

(30) Foreign Application Priority Data

Feb. 15, 2008 (KR) ........................ 10-2008-0013993

(51) Int. Cl.
*G06F 9/44*    (2006.01)
*G06F 9/40*    (2006.01)

(52) U.S. Cl.
USPC ............ 717/106; 717/110; 717/120; 717/124

(58) Field of Classification Search
USPC .................. 717/106–110, 120–126
See application file for complete search history.

(56) References Cited

U.S. PATENT DOCUMENTS

| 6,052,527 | A  | * | 4/2000  | Delcourt et al. ............. 717/138 |
| 6,370,682 | B1 | * | 4/2002  | Eckardt et al. ................ 717/141 |
| 6,609,158 | B1 |   | 8/2003  | Nevarez et al. |
| 6,698,003 | B2 |   | 2/2004  | Baumgartner et al. |
| 7,665,085 | B2 | * | 2/2010  | Sundararajan et al. ....... 717/174 |
| 7,861,223 | B1 | * | 12/2010 | Schmidt et al. ............... 717/120 |
| 8,171,470 | B2 | * | 5/2012  | Goldman et al. ............. 717/174 |
| 8,176,472 | B2 | * | 5/2012  | Kim .............................. 717/113 |
| 8,196,093 | B2 |   | 6/2012  | Son et al. |

(Continued)

FOREIGN PATENT DOCUMENTS

| JP | 2005-530238 A | 10/2005 |
| JP | 2008-003841 A | 1/2008 |

(Continued)

OTHER PUBLICATIONS

European Search Report issued May 7, 2012 in counterpart European Patent Application No. 08872297.0 (9 pages, in English).

(Continued)

*Primary Examiner* — Christopher Shin
(74) *Attorney, Agent, or Firm* — NSIP Law

(57) ABSTRACT

A method and apparatus for validating a component model-based software platform architecture, the method including: generating a virtual software platform having a template code describing functions of one or more components of software according to design information of a software platform and a build script having configuration variables according to a type of the software and building the generated template code; changing the configuration values of the configuration variables provided in the virtual software platform for a combination of the components; and validating a consistency of the software platform according to a result of executing the virtual software platform based on the changed configuration variables. According to the method and apparatus, by validating in advance whether it is possible to construct a normal composition of the software product, testing and manpower costs can be reduced.

19 Claims, 17 Drawing Sheets

(56) References Cited

U.S. PATENT DOCUMENTS

| | | |
|---|---|---|
| 2002/0147763 A1 | 10/2002 | Lee et al. |
| 2003/0046681 A1* | 3/2003 | Barturen et al. ............. 717/177 |
| 2004/0034846 A1 | 2/2004 | Ortal et al. |
| 2004/0143812 A1 | 7/2004 | Bernstein et al. |
| 2005/0005261 A1* | 1/2005 | Severin ......................... 717/108 |
| 2007/0150855 A1 | 6/2007 | Jeong |
| 2007/0157171 A1* | 7/2007 | Eastham et al. ............. 717/121 |
| 2007/0266378 A1* | 11/2007 | Fukuda ......................... 717/139 |
| 2008/0244520 A1* | 10/2008 | Hashimoto et al. .......... 717/121 |
| 2011/0072415 A1* | 3/2011 | Niggemann et al. ......... 717/120 |

FOREIGN PATENT DOCUMENTS

| | | |
|---|---|---|
| KR | 10-2004-0097941 | 11/2004 |
| KR | 10-2007-0000732 | 1/2007 |
| KR | 10-2008-0076059 | 8/2008 |
| WO | WO 01/48625 | 7/2001 |
| WO | WO 02/073379 | 9/2002 |
| WO | WO 2007/001108 A1 | 1/2007 |

OTHER PUBLICATIONS

Jernej Kovse et al. "VS-Gen: A Case Study of a Product Line for Versioning Systems," Generative Programming and Component Engineering 2004, Proceedings, GPCE2004, vol. 3286, Oct. 24, 2004-Oct. 28, 2004, pp. 396-415 (20 pages, in English).

Japanese Notice of Reason for Rejection mailed Aug. 14, 2012, issued in counterpart Japanese Patent Application No. 2010-544215; 6 pages including English translation.

"A Component Model Supporting Decomposition and Composition of Consumrer Electronics Software Product Lines," Chong-Mok Park et al., Proceedings of the 11$^{th}$ International Software Product Line Conference, Sep. 10, 2007, pp. 181-192.

Japanese Notice of Reason for Rejection mailed Dec. 18, 2012, issued in counterpart Japanese Patent Application No. 2010-544215, 3 pages.

* cited by examiner

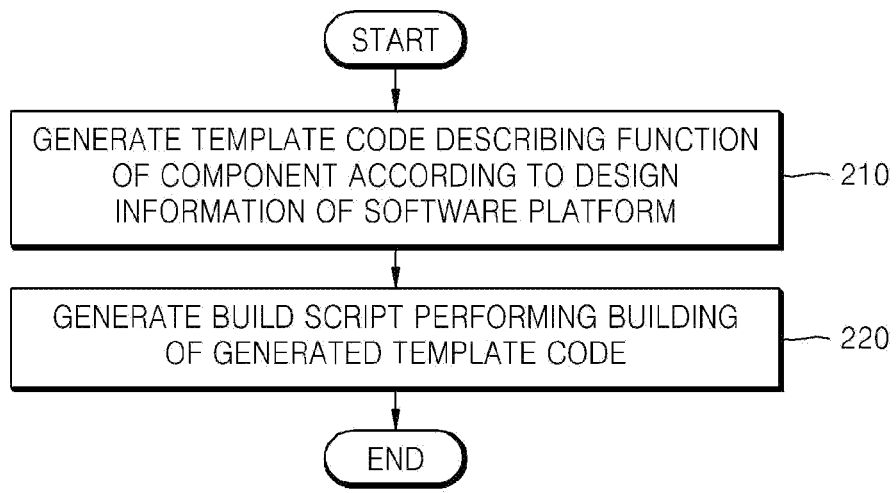
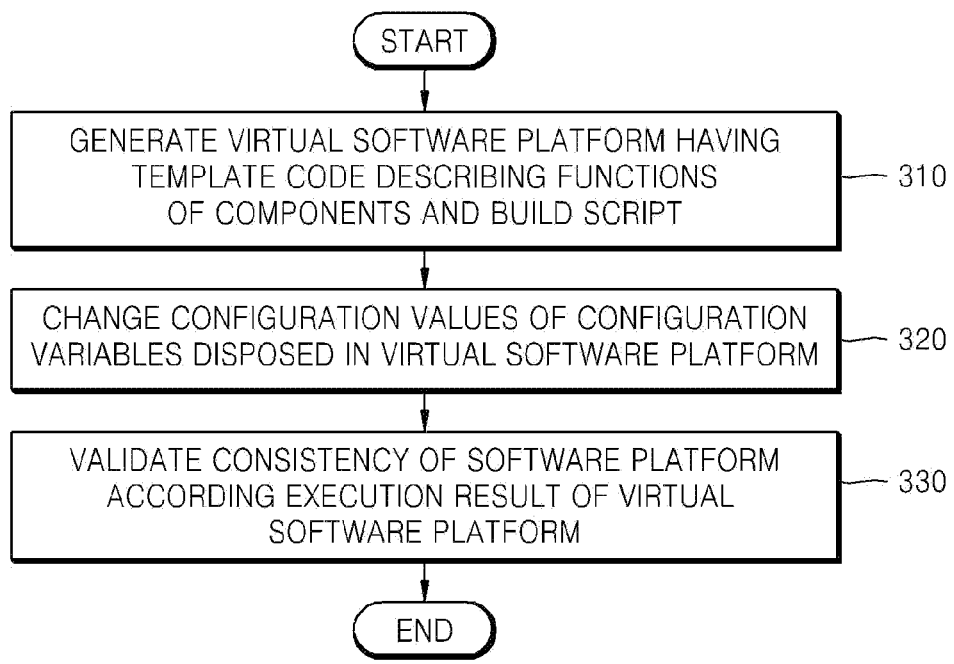

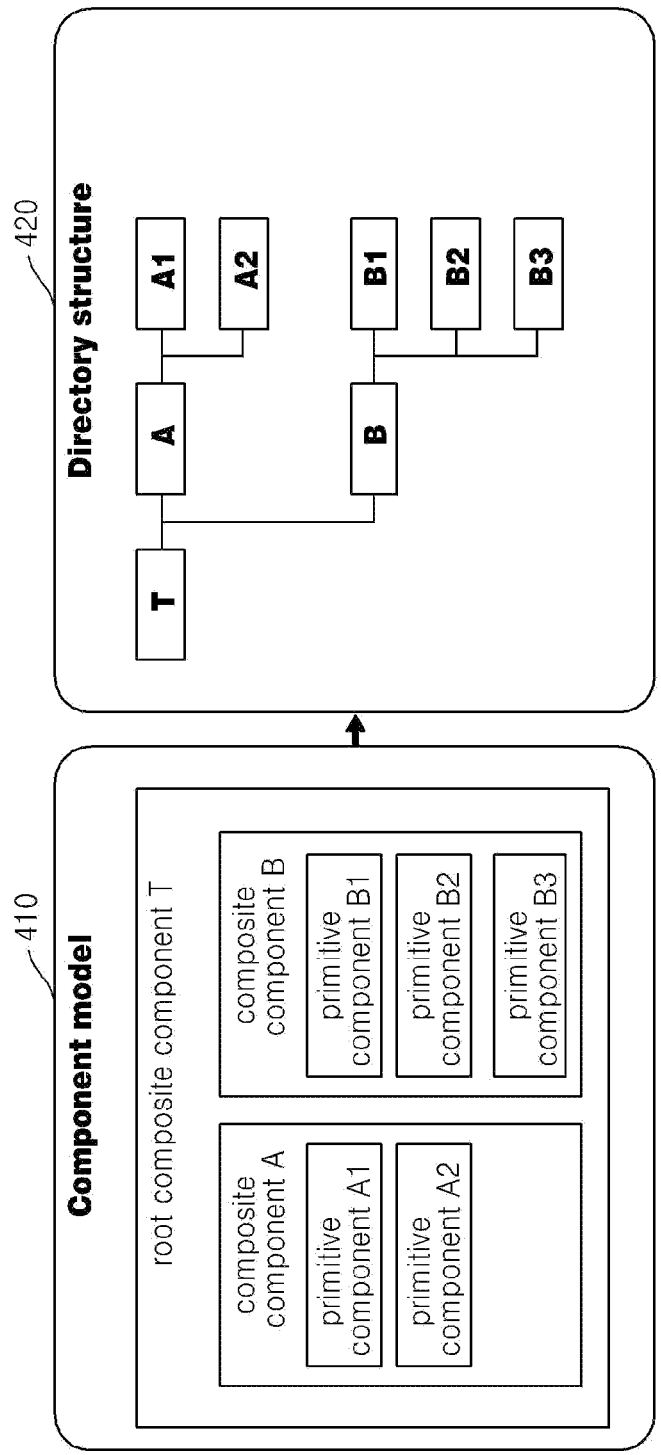

FIG. 12

Platform CDL — 1210

```
component Comp_Top
  contains {
    Comp_Level1_01 cComp_Level1_01;
    Comp_Level1_02 cComp_Level1_02;
    ...
  }
  connects {
    connect cComp_Level1_01.irl_Comp_Level2_01
      to cComp_Level1_02. ipl_Comp_Level2_01;
    connect cComp_Level1_02.irl_Comp_Level2_03
      to cComp_Level1_03. ipl_Comp_Level2_03;
    ...
  }
  configuration-variables {
    PRODUCT_TYPE values (
      Type1 represents (
        cComp_Level1_01.CV_Level1_01 = cv_level1_01_value1,
        cComp_Level1_02.CV_Level1_02 = cv_level1_02_value1,
        ...
      ),
      Type2 represents (
        cComp_Level1_01.CV_Level1_01 = cv_level1_01_value2,
        cComp_Level1_02.CV_Level1_02 = cv_level1_02_value2,
        ...
      )
    )
    default Type1;
  }
};
```

Makefile.config_option(product configuration) — 1220

- include Makefile.config_decision — 1221
- ifeq ($(PRODUCT_TYPE), Type1) — 1222
  - DEFINE = MACRO_Type1 — 1224
  - #value list of CV_Level1_01
    CV_Level1_01 = cv_level1_01_value1
  - #value list of CV_Level1_02
    CV_Level1_02 = cv_level1_02_value1
  - ...
- endif
- ifeq ($PRODUCT_TYPE), Type2) — 1223
  - DEFINE = MACRO_Type2 — 1224
  - #value list of CV_Level1_01
    CV_Level1_01 = cv_level1_01_value2
  - #value list of CV_Level1_02
    CV_Level1_02 = cv_level1_02_value2
  - ...
- endif

FIG. 13

Sub Component CDL (1310)

```
component Comp_Level1_01 {
  contains {
    Comp_Level2_01 cComp_Level2_01;
    Comp_Level2_02 cComp_Level2_02;
    ...
  }
  require {
    l_Comp_Level2_01 irl_Comp_Level2_01;
    ...
  }
  connects {
    connect cComp_Level2_01.irl_Comp_Level3_01
      to cComp_Level2_02.ipl_Comp_Level3_01;
    connect cComp_Level2_02.irl_Comp_Level3_03
      to cComp_Level2_03.ipl_Comp_Level3_03;
    ...
  }
  configuration-variables {
    CV_Level1_01 values (
      cv_level1_01_value1 represents (
        cComp_Level2_01.CV_Level2_01 = cv_level2_01_value1,
        cComp_Level2_02.CV_Level2_02 = cv_level2_02_value1,
        ...),
      cv_level1_01_value2 represents (
        cComp_Level2_01.CV_Level2_01 = cv_level2_01_value2,
        cComp_Level2_02.CV_Level2_02 = cv_level2_02_value2,
        ...));
  }
};
```

Makefile.config_mapping (variable mapping) (1320)

- includeMakefile.config_option (1321)
- \### Comp_Level1_01 configuration variables (1322)
  ```
  ifeq($(CV_Level1_01), cv_level1_01_value1)
    CV_Level2_01 = cv_level2_01_value1
    CV_Level2_02 = cv_level2_02_value1
  endif
  ifeq($(CV_Level1_01), cv_level1_01_value2)
    CV_Level2_01 = cv_level2_01_value2
    CV_Level2_02 = cv_level2_02_value2
  endif
  ```
- (1323)
  ```
  ifeq($(CV_LevelN_01), on)
    DEFINE += MACRO_CV_LevelN_01    (1324)
  endif
  ifeq($(CV_LevelN_02), on)
    DEFINE += MACRO_CV_LevelN_02    (1324)
  endif
  ```

FIG. 14

Makefile.config_path (component build path) — 1410 includeMakefile.config_mapping — 1411

Tool Chain — 1412
CC =gcc
RANLIB = ranlib
AR =ar

BASE_DIR = ./.. — 1413

TARGET
TARGET_NAME = DPP
TARGET_DIR = $(BASE_DIR)/Build/Debug
TARGET_LIB = $(TARGET_DIR)/lib
TARGET_BIN = $(TARGET_DIR)/bin
TARGET_OBJS = $(TARGET_DIR)/objs

Component — 1414
Comp_Level1_01_DIR = $(BASE_DIR)/Comp_Level1_01
Comp_Level1_01_INC =
  $(Comp_Level2_01_INC)\
  $(Comp_Level2_02_INC)\
  $(Comp_Level2_03_INC)\
...
Comp_Level1_01_LIB =
  $(Comp_Level2_01_LIB)
ifeq($(CV_Level2_02), ON)
  Comp_Level1_01_LIB += $(CV_Level2_02_LIB)
endif
ifeq($(CV_Level2_03), ON)
  Comp_Level1_01_LIB += $(CV_Level2_03_LIB)
endif
...

— 1415

Comp_LevelN_01_DIR = $(Comp_LevelM_01_DIR)/Comp_LevelN_01
Comp_LevelN_01_INC = $(Comp_LevelN_01_DIR)/include
Comp_LevelN_01_LIB = Comp_LevelN_01

Comp_LevelN_02_DIR = $(Comp_LevelM_01_DIR)/Comp_LevelN_02
Comp_LevelN_02_INC = $(Comp_LevelN_02_DIR)/include
Comp_LevelN_02_LIB = Comp_LevelN_02

FIG. 15

Makefile.Comp_Level1_01 (composite component build) — 1510 include  Makefile.config_path — 1511 all: Comp_Level1_01
    @echo "Build Comp_Level1_01 Completed!" — 1512

Comp_Level1_01 : — 1513
    @echo "### Build Comp_Level1_01 ###"
    make -f Makefile.Comp_Level2_01
    make -f Makefile.Comp_Level2_01 ifeq ($(CV_Level2_03), ON)
        make -f Makefile.Comp_Level2_03
    endif ifeq ($(CV_Level2_04), ON)
        make-f Makefile.Comp_Level2_04
    endif

. . .

clean: — 1514
    @echo "### Clean Comp_Level1_01 ###"
    make  -f Makefile.Comp_Level2_01 clean
    make  -f Makefile.Comp_Level2_02 clean
    make  -f Makefile.Comp_Level2_03 clean
    make  -f Makefile.Comp_Level2_04 clean

Makefile.Comp_LevelN_01 (primitive component build) /1520 includeMakefile.config_path     1521

```
Comp_LevelN_01_SRCS = $(shell find $(Comp_LevelN_01_DIR)/-name '*.cpp')
Comp_LevelN_01_OBJS = $(Comp_LevelN_01_SRCS:.cpp=.o)

INCLUDES = \
   $(addprefix - 1,\
   $(Comp_Level01_1_INC)\
   $(Comp_Level01_2_INC)\
   $(Comp_Level01_3_INC)\
   . . .
)

CXXFLAGS = - Wall - g - O2 $(INCLUDES)
```
1522

```
all: $(Comp_LevelN_01_OBJS)
   @echo "### Build Comp_LevelN_01 ###"
   $(AR) cru $(TARGET_LIB)/lib$(Comp_LevelN_01_LIB).a $?
   $(RANLIB) $(TARGET_LIB)/lib$(Comp_LevelN_01_LIB).a
```
1523

```
clean:
   @echo "### Build Comp_LevelN_01 ###"
   rm -rf $(TARGET_LIB)/lib$(Comp_LevelN_01_LIB).a
   rm -rf $(Comp_LevelN_01_OBJS)
```
1524

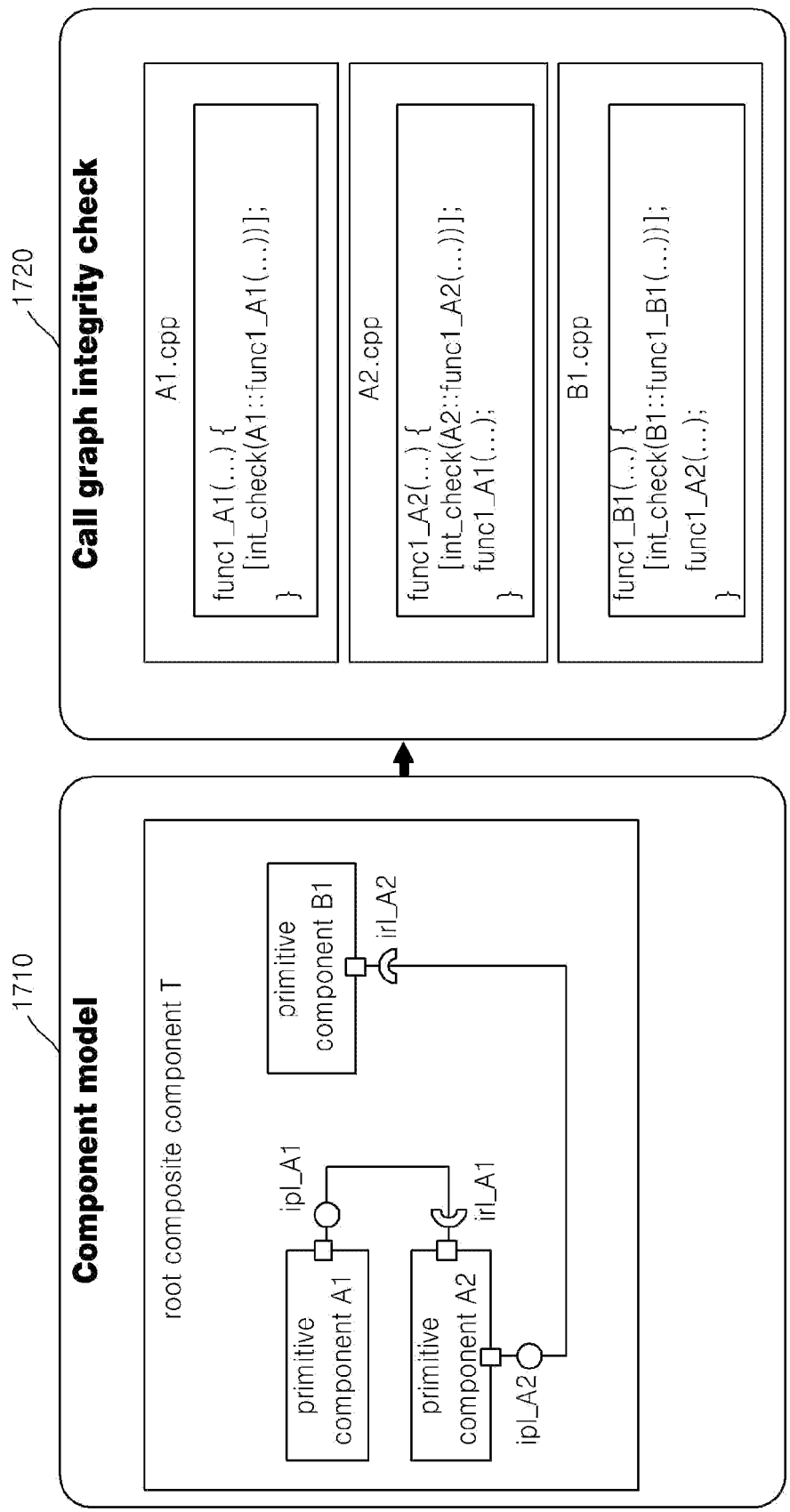

FIG. 18

| Call Graph Check | | | | Product Types | | | | | | |
|---|---|---|---|---|---|---|---|---|---|---|
| Caller Components | | Callee Components | | Type1 | | Type2 | | Type3 | | ... |
| | | | | Design | Run | Design | Run | Design | Run | ... |
| Component A1 | func1_A1 | A2 | func2_A2 | O | O | O | O | | | |
| | func2_A1 | A1 | func2_A1 | O | O | | | | | |
| | | ... | ... | | | | | | | |
| | | C1 | func3_C1 | O | O | | O | O | O | |
| | | C2 | func2_C2 | O | O | O | O | O | O | |
| | ... | ... | ... | | | | | | | |
| Component A2 | func1_A2 | A3 | func1_A3 | O | O | | | | | |
| | | B1 | func2_B1 | | | O | O | O | | |
| | | ... | ... | | | | | | | |
| | func2_A2 | B1 | func1_B1 | O | O | | | | | |
| | | – | – | | | | | | | |
| | ... | ... | ... | | | | | | | |
| Component B1 | func1_B1 | – | – | | | | | | | |
| | func2_B1 | C3 | func2_C3 | O | O | | | O | X | |
| | | C3 | func4_C3 | O | O | | O | | O | |
| | ... | ... | ... | | | | | | | |
| ... | | | | | | | | | | |

METHOD AND APPARATUS FOR GENERATING VIRTUAL SOFTWARE PLATFORM BASED ON COMPONENT MODEL AND VALIDATING SOFTWARE PLATFORM ARCHITECTURE USING THE PLATFORM

CROSS-REFERENCE TO RELATED PATENT APPLICATION

This application claims the benefit of Korean Patent Application No. 2008-13993, filed on Feb. 15, 2008 in the Korean Intellectual Property Office, the disclosure of which is incorporated herein in its entirety by reference.

BACKGROUND OF THE INVENTION

1. Field of the Invention

Aspects of the present invention relate to a method of generating a virtual software platform based on a component model, and a method of validating a software platform architecture using the platform, and more particularly, to a method and apparatus by which in order to validate the platform architecture of a software product being developed based on a component model, a virtual platform is generated before direct internal implementation of a code, and by using the virtual platform, integrity and reliability of component model design information can be validated.

2. Description of the Related Art

In software development, a design stage is a process in which detailed operations to be implemented in an implementation stage are identified and a structure in which a variety of elements are mutually linked using an appropriate method is confirmed in advance, thereby aiding quick and faultless development. As software packages increase in size and complexity, the desire for securing better speed and accuracy through an automated system in this design stage increases.

In the field of embedded software (such as consumer electronics (CE) software), fusing and mixing of operations and coupling of new operations frequently occur. Furthermore, according to market trends, fast shipment may be requested and a mass production system may be needed. Accordingly, small errors in design and implementation of software should be accurately detected and corrected. In particular, once the implementation is completed, testing costs rapidly increase. Accordingly, the present concept of testing is evolving to include validating software in advance in a requirement analysis and design stage, thereby minimizing occurrences of errors in the following stages.

A software product line (SPL) system to effectively support development of multiple products based on reusability and variability in CE software development uses a method capable of performing automation of validation of a platform itself and implementation based on design information.

In general, software is developed as a completed product through a sequence of requirement analysis, design, implementation, test, and distribution stages. Whether software is implemented in accordance with a design is confirmed through generating a test case in a test stage. According to conventional technology, the test stage that is regarded as the final stage of software development is performed after being broadly divided into such categories as a unit test for each unit operation, an integration test in which all unit operations of a whole system are linked, and a system test for performance and non-operational items. That is, in order to test a software code whose implementation development is completed, such tests as the unit test, integration test, and system test for the software code are performed along with the correction of errors, and the code is revised to reflect the corrections. In this way, the code is gradually developed into a stabilized software product.

As the size of software code has recently become huge, the operational limitations of the test method according to the conventional development process have been recognized and technologies and methods for more effective testing have been studied. Among them, test driven development (TDD) is a method focusing on reducing costs of test and modification concentrated in the second half of development, by performing tests through all areas of development processes. At present, conventional technologies are focused on the testing of implementation code.

Meanwhile, when a variety of types of software products are being developed, there is a trend of adding characteristic additional operations based on common platforms. Major elements in the evaluation of quality of software in this case relates to the reliability of new operations as well as the stability of the platform itself. However, the limitation of the conventional technology in the development of CE software is that it is difficult to precisely validate the design of a platform in which multiple products of software are integrated.

A platform in software development should not only individually describe the structure of each software product itself, but also be able to express a structure integrating a base platform and all variable elements. For this, there is a need for a component model in which such concepts as variability, component, dependency, and configuration can be effectively combined. Accordingly, based on this component model, validation of a design structure of a platform together with implementation can be performed.

SUMMARY OF THE INVENTION

Aspects of the present invention provide a method and apparatus to implement automation with a software platform architecture through a systematic component model and to support validation of consistency between design and implementation in development of software.

The foregoing and/or other aspects of the present invention are achieved by providing a method of generating a virtual software platform based on a component model, the method including: generating a template code describing functions of one or more components of software according to design information of a software platform; and generating a build script having configuration variables according to a type of the software and building the generated template code.

According to another aspect of the present invention, the generating of the template code may include: generating a directory structure indicating an inclusion relationship between an upper-level component and a lower-level component from among the one or more components; applying a dependency element indicating a dependency relationship between an interface of a first component and a second component using the interface, from among the one or more components; and applying a variability element for selecting a plurality of the components in an inclusion relationship or a dependency relationship according to the configuration variables.

According to another aspect of the present invention, the generating of the build script may include: defining a type variable to select the type of the software; describing a lower-level configuration variable linked to the type variable; specifying a configuration value according to a mapping relationship between configuration variables; and configuring path information of a source code of each component.

According to another aspect of the present invention, the generating of the build script may include adding a conditional statement in the build script in order to apply the variability element.

According to another aspect of the present invention, the variability element may be an option variability for removing a predetermined component from a path of the build script or a switch variability for selecting a predetermined component according to a configured value of a configuration variable.

According to another aspect of the present invention, the generating of the build script may include: for a composite component, constructing the build script so that a build script for a lower-level component can be recursively called; and for a primitive component, constructing the build script so that a build process for a source code of the primitive component can be described.

The foregoing and/or other aspects of the present invention are achieved by providing a method of validating a software platform architecture based on a component model, the method including: generating a virtual software platform having a template code describing functions of one or more components of software according to design information of a software platform and a build script having configuration variables according to a type of the software and building the generated template code; changing configuration values of the configuration variables provided in the virtual software platform for a combination of the components; and validating a consistency of the software platform according to a result of executing the virtual software platform based on the changed configuration variables.

According to another aspect of the present invention, the changing of the configuration values may include: configuring a variability element provided in a component; and building the virtual software platform according to the configuring.

According to another aspect of the present invention, the validating may include: comparing a call graph obtained from design information of the software platform with a graph of a function call according to the executing of the virtual software platform; and determining dependency and/or integrity of the software platform based on the comparing.

According to another aspect of the present invention, the validating may include: comparing contents of a product specification of the software with a directory construction of the one or more components according to the executing of the virtual software platform; and examining the design information for the software product according to the changed configuration value based on the comparing.

According to another aspect of the present invention, the method may further include managing a list of one or more elements of the component model from among components, interfaces, connections, and variability elements of the component model.

According to another aspect of the present invention, the managing of the list of the one or more elements of the component model may include processing language syntax for defining a variable corresponding to a variability element provided in the component.

The foregoing and/or other aspects of the present invention are achieved by providing an apparatus for generating a virtual software platform based on a component model, the apparatus including: a code generator generating a template code describing functions of one or more components of software according to design information of a software platform; and a build script generator generating a build script having configuration variables according to a type of the software and building the generated template code.

The foregoing and/or other aspects of the present invention are achieved by providing an apparatus for validating a software platform architecture based on a component model, the apparatus including: a virtual platform generator generating a virtual software platform having a template code describing functions of one or more components of software according to design information of a software platform and a build script having configuration variables according to a type of the software and building the generated template code; a virtual platform configurator changing configuration values of the configuration variables provided in the virtual software platform for combination of the components; and an architecture validation manager validating a consistency of the software platform according to a result of executing the virtual software platform based on the changed configuration variables.

According to another aspect of the present invention, the apparatus may further include a component model manager managing a list of one or more elements of the component model from among components, interfaces, connections, and variability elements of the component model.

The foregoing and/or other aspects of the present invention are achieved by providing a computer readable recording medium having embodied thereon a computer program for executing a method of generating a virtual software platform based on a component model and a method of validating a software platform architecture by using the software platform.

The foregoing and/or other aspects of the present invention are achieved by providing a system for validating a software platform architecture, the system including: an apparatus for generating a virtual software platform based on a component model, the apparatus including: a code generator to generate a template code describing functions of one or more components of software according to design information of the software platform architecture, and a build script generator to generate a build script having configuration variables according to a type of the software and building the generated template code; and an apparatus for validating the software platform architecture based on the component model, the apparatus including: a virtual platform configurator to change configuration values of the configuration variables provided in the virtual software platform for a combination of the components, and an architecture validation manager to validate a consistency of the software platform according to a result of executing the virtual software platform based on the changed configuration variables.

The foregoing and/or other aspects of the present invention are achieved by providing an apparatus for validating a software platform architecture based on a component model using a virtual software platform having a template code describing functions of one or more components of software according to design information of the software platform architecture and a build script having configuration variables according to a type of the software and building the generated template code, the apparatus including: a virtual platform configurator to change configuration values of the configuration variables provided in the virtual software platform for a combination of the components; and an architecture validation manager to validate a consistency of the software platform according to a result of executing the virtual software platform based on the changed configuration variables.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart showing a method of generating a virtual software platform based on a component model, according to an embodiment of the present invention;

FIG. 3 is a flowchart showing a method of validating a software platform architecture based on a component model, according to an embodiment of the present invention;

FIG. 4 is a diagram illustrating a physical directory structure implemented in a process of generating a virtual software platform, according to an embodiment of the present invention;

FIG. 12 is a diagram illustrating a structure of makefile.config_option, which is a build script for configuring a software product, according to an embodiment of the present invention;

FIG. 13 is a diagram illustrating a structure of makefile.config_mapping, which is a build script for mapping a configuration variable, according to an embodiment of the present invention;

FIG. 14 is a diagram illustrating a structure of makefile.config_path, which is a build script for a component build path, according to an embodiment of the present invention;

FIG. 15 is a diagram illustrating a structure of a makefile of a composite component, according to an embodiment of the present invention;

FIG. 16 is a diagram illustrating a structure of a makefile of a primitive component, according to an embodiment of the present invention;

FIG. 17 is a diagram illustrating a call graph integrity check code, according to an embodiment of the present invention; and FIG. 18 is a diagram illustrating a call graph integrity check table, according to an embodiment of the present invention.

DETAILED DESCRIPTION OF THE EMBODIMENTS

Figure 1:
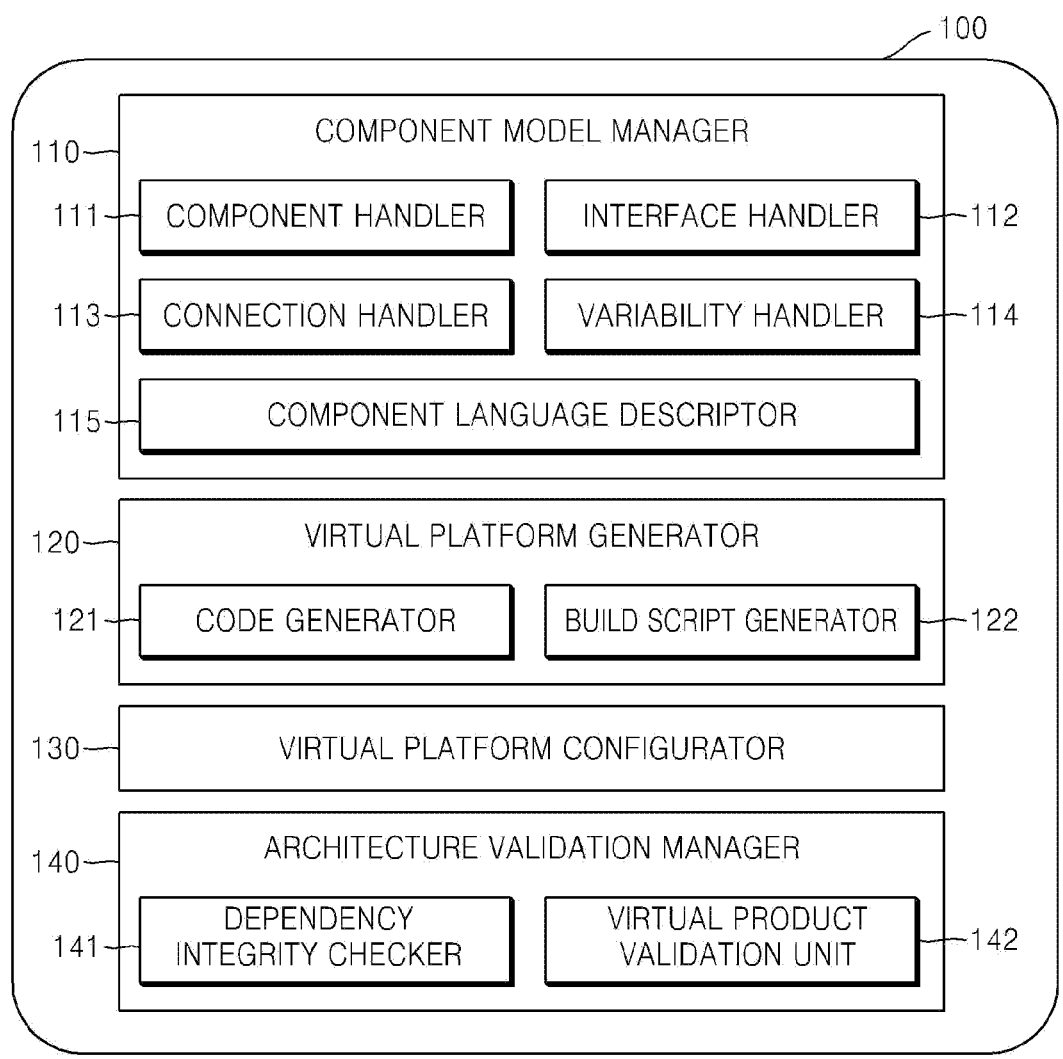
FIG. 1 is a diagram illustrating components of an apparatus for validating a software platform architecture, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a method and apparatus to validate a platform architecture of consumer electronics (CE) software being developed based on a component model in the side of a software product line (SPL). Specifically, according to aspects of the present invention, integrity and reliability of component model design information is examined through generation and configuration of a virtual platform before direct internal implementation of a code. That is, in the development of CE software based on a component model for reusability and SPL operation (i.e., component-based software engineering), a method of automating implementation with a software platform architecture and supporting validation and management of consistency between design and implementation is provided. However, it is understood that aspects can be used in non-CE platform software development.

FIG. 1 is a diagram illustrating components of an apparatus 100 for validating a software platform architecture, according to an embodiment of the present invention. Referring to FIG. 1, the apparatus 100 for validating a software platform architecture includes a component model manager 110, a virtual platform generator 120, a virtual platform configurator 130, and an architecture validation manager 140 in order to validate integrity and reliability of a software platform architecture. The virtual platform generator 120 generates a virtual software platform having a template code describing functions of one or more components according to design information of a software platform (as determined, for example, by a software developer) and a build script having configuration variables according to the type of software. Furthermore, the component model manager 110 builds the generated template code. The virtual platform configurator 130 changes the configuration values of the configuration variables provided in the virtual software platform for combination of the components. The architecture validation manager 140 validates consistency of the software platform according to the result of executing the virtual software platform based on the changed configuration variables. The component model manager 110 manages a list of one or more elements of a component model (such as components, interfaces, connections, and/or variability).

While not required, it is understood that the apparatus can be implemented using a general or special purpose computer or workstation, and that the elements 110, 120, 130, 140 can be disposed on different computers accessed over a network. The terms used in the present specification will now be generally explained before explaining details of each of the above elements and sub modules.

A configuration variable is a variable for expressing variability in a software platform structure described as a component model.

A variability point is a part in which a variable characteristic or a characteristic corresponding to a software product exists when a software product is constructed.

A software product line (SPL) is a system of management and construction of software elements for developing a variety of products from a software platform. Specifically, a software product may be formed by elements selectively combined according to a development requirement with a software platform, including both common elements and variable elements. A variety of these software products have common elements, and therefore form a predetermined product family.

A software component is a unit obtained by dividing software according to functions. Specifically, a software product is formed by numerous source codes, build scripts, libraries, etc. However, a software component is not a physical code file, script, or directory itself. Rather, a plurality of directories may be defined as one component, and one piece of source code may be defined as one component.

A primitive component is a unit component, and a composite component is formed by combining a plurality of primitive components.

A provide interface expresses functions provided by a predetermined component when describing a connection relationship between components. A require interface expresses when the predetermined component uses a function of another component. Hereinafter, in drawings showing component models, "ip (interface provided)" is used as a prefix for "provide interface" and "ir (interface required)" is used as a prefix for "require interface."

A root composite component is a top-level composite component with a largest size having primitive components and sub composite components internally.

A function-level component (FLC) is a logical unit used to design a component model. Each of a plurality of primitive components and composite components forming a whole system belongs to the FLC category.

A build-level component (BLC) is a component unit that is as an actual implementing body of an FCL, and has a correspondence relationship with only primitive components. In a combination of components, one FLC is mapped to at least one or more BLCs implementing the function of the FLC.

A component description language (CDL) is a rule for describing an FLC component structure. In the case of a primitive component, the component is expressed by "provide interface" or "require interface," but in the case of a composite component, information on a mutual connection relationship between a sub component and configuration variables is additionally expressed.

An interface description language (IDL) expresses details on which functions are actually included, as described in provide interfaces provided by all primitive components.

A build-level component description language (BCDL) expresses information on the BLC that is an actual implementation of each component. The BCDL may include source, library, and build information to implement a predetermined component.

Referring back to FIG. 1, the component model manager 110 includes a component handler 111, an interface handler 112, a connection handler 113, and variability handler 114, and a component language descriptor 115. Furthermore, the component model manager 110 manages elements formed based on a component model when a software platform architecture is designed. Specifically, the component model manager 110 manages lists of addition, change, and removal of each element of a component model (such as components, interfaces, connections, and variability), and manages the entire structure information of a platform architecture in connection with the component handler 111, the interface handler 112, the connection handler 113, and the variability handler 114.

The component handler 111 manages lists and characteristic information of component elements among element information items of a component model managed through the component model manager 110. Generally, each component in a software platform is formed with primitive components and composite components, and the composite components reflect a sub system structure together with a hierarchical directory structure. The component handler 111 identifies and manages information on links between these components.

The interface handler 112 manages lists and characteristic information of interface elements among element information items of a component model managed through the component model manager 110. An interface is an element describing a function provided by a component and a function used by the component as a function set, and becomes a tool for interactions between components. The interface hander 112 manages lists of interface elements and link information between components and interfaces.

The connection handler 113 manages lists and characteristic information of connection elements expressing reliance relationships between components. A connection refers to the connection itself between interfaces and is an element expressing an existence of actual link relationships in a component model. The connection handler 113 manages lists and information of connection elements.

The variability handler 114 manages lists and characteristic information of variability elements among element information items of a component model managed through the component model manager 110. Variability is an element that allows for a distinguishing between a common unit and a variable unit of a software platform. Furthermore, by selecting in a variety of ways a component in which variability is set, a basis for unifying all components in software platform design information is provided. The variability handler 114 manages lists of variability elements and configuration condition information of each variability element.

The component language descriptor 115 controls a processing language for describing a component model. Generally, the component language descriptor 115 includes construction information of primitive components and composite components, and supports a syntactic form defining a variable corresponding to a variability point. More specifically, as syntactic blocks expressed in a composite component including a variability point, "contains" indicates a list of lower-level components included in the composite component, "provides" indicates a list of provide interfaces provided by lower-level components in the case of a composite component, as a provide interface of a component, "requires" indicates a list of require interfaces from lower-level components in the case of a composite component, as a require interface of a component, "connects" describes a connection relationship between provide/require interfaces, and "configuration-variables" describes a list of variables and values to correspond to a variability point. The component language descriptor 115 processes and generates syntax of a component description language (CDL), an interface description language (IDL), a build-level component description language (BCDL), and a product configuration language (PCL).

The virtual platform generator 120 controls a generating of a virtual software platform for validating reliability of a software platform architecture design, and includes a code generator 121 and a build script generator 122. According to a design structure of a software platform formed as a component model, the software platform design is validated according to whether elements (such as component reliability and variability configuration) can satisfy all configuration paths. For this, a source code and build script for each component may be generated and configuration according to variability elements may be prepared. Moreover, the virtual platform generator 120 identifies construction items, and performs a function for requesting link modules (such as the code generator 121 and the build script generator 122) to generate jobs. The virtual platform generator 120 operates according to a platform validation request from the architecture validation manager 140.

The code generator 121 controls an actual construction and generation of a physical source code corresponding to a component model in a linked operation with the virtual platform generator 120. The code generator 121 relates to each of a plurality of jobs illustrated in FIGS. 4 through 9, and performs functions of generating an actual directory, processing a conditional statement inside a source code, determining header inclusion according to component reliability, and adding codes for function call integrity check.

The build script generator 122 controls a construction and generation of a physical build script corresponding to a component model in a linked operation with the virtual platform generator 120. The build script generator 122 relates to each of a plurality of jobs illustrated in FIGS. 10 through 16, and performs functions of generation of a build script and processing of a conditional statement inside a build script. The generation of a build script reflects a variability construction form of a component model and a build script has a hierarchical construction.

The virtual platform configurator 130 configures variability of a component model to a predetermined state, and controls setting and build functions for confirming whether the platform construction at this time can be normally executed according to a design. As a concept different from a test for a time when all internal implementations are completed in terms of validation of design information, validation is performed by confirming whether component source code and build scripts combined and constructed according to variability generate an error. According to a platform validation request from the architecture validation manager 140, the virtual platform configurator 130 operates after a virtual platform is generated through the virtual platform generator 120.

The architecture validation manager 140 controls platform validation by confirming whether a normal component combination and build matching each design are possible in relation to configuring of configuration variables included in a component model for each software product list. Generation and configuration of a virtual platform are performed through the virtual platform generator 120 and the virtual platform generator 130, and the result is analyzed and determined. As shown, the architecture validation manager 140 includes a dependency integrity checker 141 and a virtual product validation unit 142.

The dependency integrity checker 141 determines whether function call relationships between source codes are performed as designed. Specifically, the dependency integrity checker 141 determines whether the function call relationships are performed as designed by comparing a call graph from design information with a call graph recorded based on actual calls.

If a virtual platform is configured and built, the virtual product validation unit 142 confirms whether appropriate components are included as designed according to PCL configuration describing each product specification and configuring of configuration variables is performed normally.

FIG. 2 is a flowchart showing a method of generating a virtual software platform based on a component model, according to an embodiment of the present invention. Referring to FIG. 2, a template code describing functions of one or more components according to design information of a software platform is generated in operation 210. Then, a build script having configuration variables according to the type of software is generated and the generated template code is built in operation 220. Each operation will be explained in detail with reference to FIGS. 3 through 16.

FIG. 3 is a flowchart showing a method of validating a software platform architecture based on a component model, according to an embodiment of the present invention. Referring to FIG. 3, a virtual software platform having a template code describing functions of one or more components according to design information of a software platform and a build script having configuration variables according to the type of software are generated, and the generated template code is built in operation 310. Then, the configuration values of the configuration variables disposed in the virtual software platform are changed in operation 320 for combination of the components. Consistency of the software platform is validated in operation 330 according to the result of executing the virtual software platform based on the changed configuration variables.

Furthermore, the validation method may further include an operation to manage a list of one or more elements (such as components, interfaces, connections, and variability).

It is understood that software platform architecture validation refers to a confirmation of reliability of construction information of an integrated platform including all design information items of a software product. Here, the reliability indicates that derivation of an individual product from the construction of an integrated platform is possible. Design construction information of a software platform is described as configuration elements for composition of software products based on the platform, and variability elements for expressing the configuration information. A component model becomes a basis capable of systematically linking and managing these elements.

In a top-down process in which implementation is performed from design information, a job of confirming whether a component composition appropriate to each software product can be achieved by performing configuration of a software platform may be performed before internal implementation of a component itself. In a situation where a software platform that is yet to be generated is to be validated by using only design information, a virtual software platform is used.

A procedure accompanying validation of a software platform architecture includes an operation to generate a virtual platform and an operation to configure a virtual platform. The operation to generate the virtual platform generates a virtual frame structure of a component model based on architecture design information. The operation to configure the virtual platform constructs a software product composition based on architecture design information.

A method of performing validation of a component model that is design construction information of a software platform architecture according to aspects of the present invention will now be explained with reference to FIG. 1. Referring to FIG. 1, the component model manager 110 manages component model editing and change details performed by a user managing or participating in a software platform design, and describes a changed component model through the component language descriptor 115. Furthermore, the component model manager 110 controls the component handler 111, the interface handler 112, the connection handler 113, and the variability handler 114 to analyze lists and detailed information of each element so that information on each element included in a component model can be independently managed.

Then, through the architecture validation manager 140, validation of a software platform architecture based on a component model is performed. The architecture validation manager 140 requests the virtual platform generator 120 to execute a job. Next, through the virtual platform generator 120, template code and build script generation jobs based on a component model are executed. According to a request of the virtual platform generator 120, the code generator 121 generates directories and source codes according to a hierarchical structure, applies variability settings, and applies reliability settings. According to a request of the virtual platform generator 120, the build script generator 122 generates a build script according to variability configuration and a hierarchical structure. The generated build script includes both a build script for the entire platform configuration, and build scripts for respective elements.

After the virtual platform is generated, validation of configuration of the virtual platform and generation of a software product is requested from the virtual platform configurator 130 through the architecture validation manager 140. Accordingly, the virtual platform configurator 130 changes a configuration value of a top-level configuration variable for configuring a software product described in makefile.config_decision from among build scripts. The dependency integrity checker 141 calls an execution file of a software product for which a build job is completed, and confirms whether the call graphs of template functions match the design construction. After the virtual software platform is built, the virtual product validation unit 142 compares PLC description contents defining the product specification of a software product with the actual directory construction. Finally, the architecture validation manager 140 determines the design validation result of the software platform based on an examination result of the dependency integrity checker 141 and the virtual product verifier 142.

A process of generating a virtual software platform indicates each operation that is executed when a validation function is requested after a component model design for a software platform architecture construction is performed. Each operation will now be explained in more detail.

FIG. 4 is a diagram illustrating a physical directory structure 420 implemented in a process of generating a virtual software platform, according to an embodiment of the present invention. The process of generating a physical directory structure 420 between components defines each component and determines the path and arrangement of the components in a hierarchical form according to a software platform structure designed as a component model 410.

In the component model 400, a root composite component T, which is a top-level composite component, is set as a top-level directory and directories for lower-level composite and primitive components A, B, A1, A2, B1, B2, B3 are generated sequentially according to a hierarchical structure of the internal configuration. Each primitive component disposed at the bottom level may also have a separate lower-level directory for a header file and a source file according to a condition configuration that is set when a virtual platform is generated.

Here, FIG. 4 illustrates an example in which the top-level composite component T as a software platform and a directory structure 420 according to an internal component configuration are generated. A lower-level component is generated and arranged inside the directory of an upper-level component. In this case, a generated relative path is used as reference information for subsequently defining a build-level component (BLC).

Figure 5:
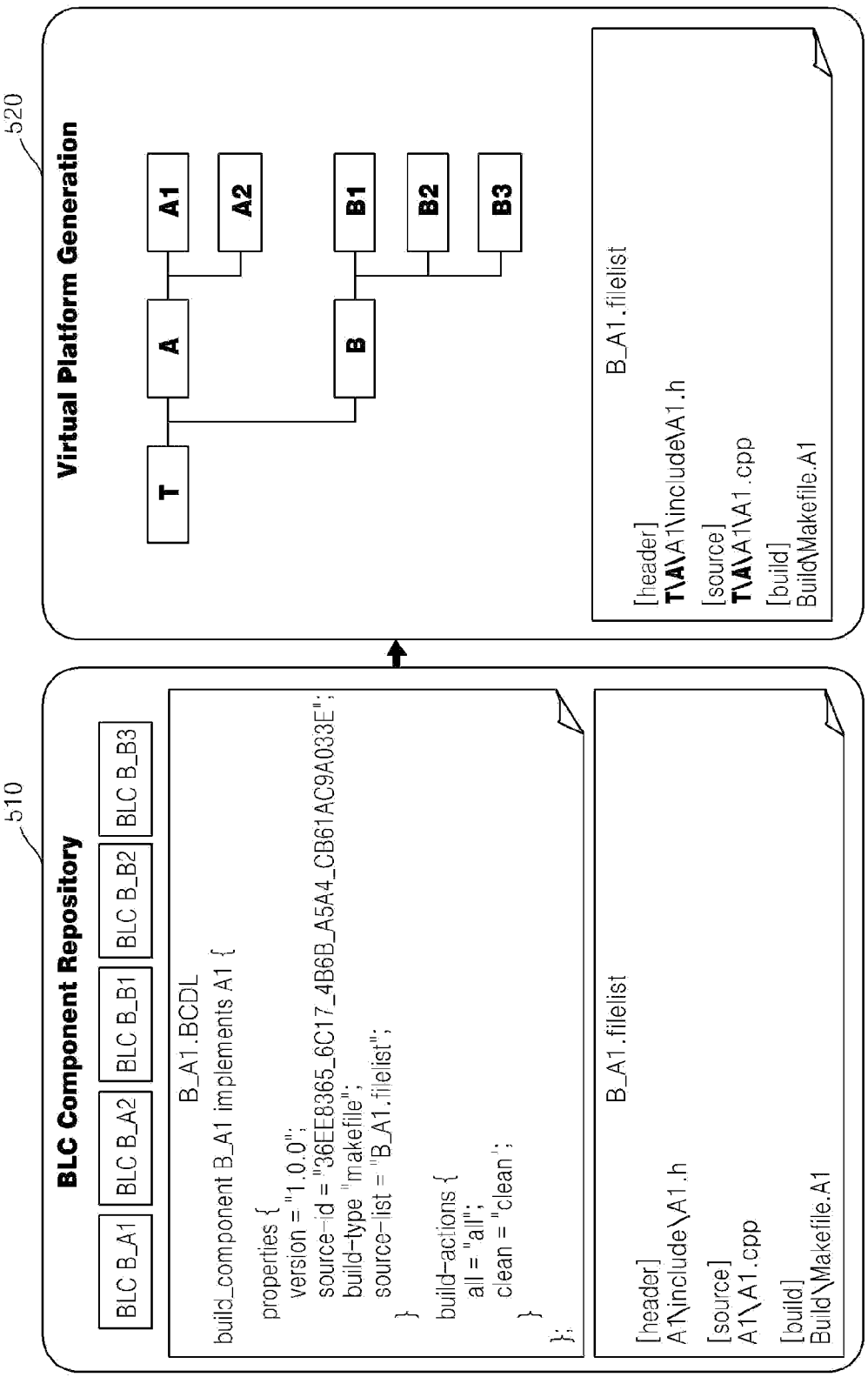
FIG. 5 is a diagram illustrating an example in which a build-level component (BLC) implemented in a process of generating a virtual software platform is applied, according to an embodiment of the present invention.

FIG. 5 is a diagram illustrating an example in which a BLC implemented in a process of generating a virtual software platform is applied, according to an embodiment of the present invention. Referring to FIG. 5, an internal description format of a BCDL and filelist documents for describing BLC information are illustrated. In terms of a component composition, a BLC is stored in a BLC component repository 510 after a basic BCDL, in which a relative path other than the BLC is not written, and a filelist are first generated. Then, a relative path is specified by arranging the BLC in a component model, and the BCDL and filelist are modified to apply the relative path, and a unique position in the software platform structure is given (see the bold letters in "B_A1.filelist" in the virtual platform generation 520). By doing so, the BCDL and filelist reflecting another relative path can be generated when a component model for a new software platform is designed.

Figure 6:
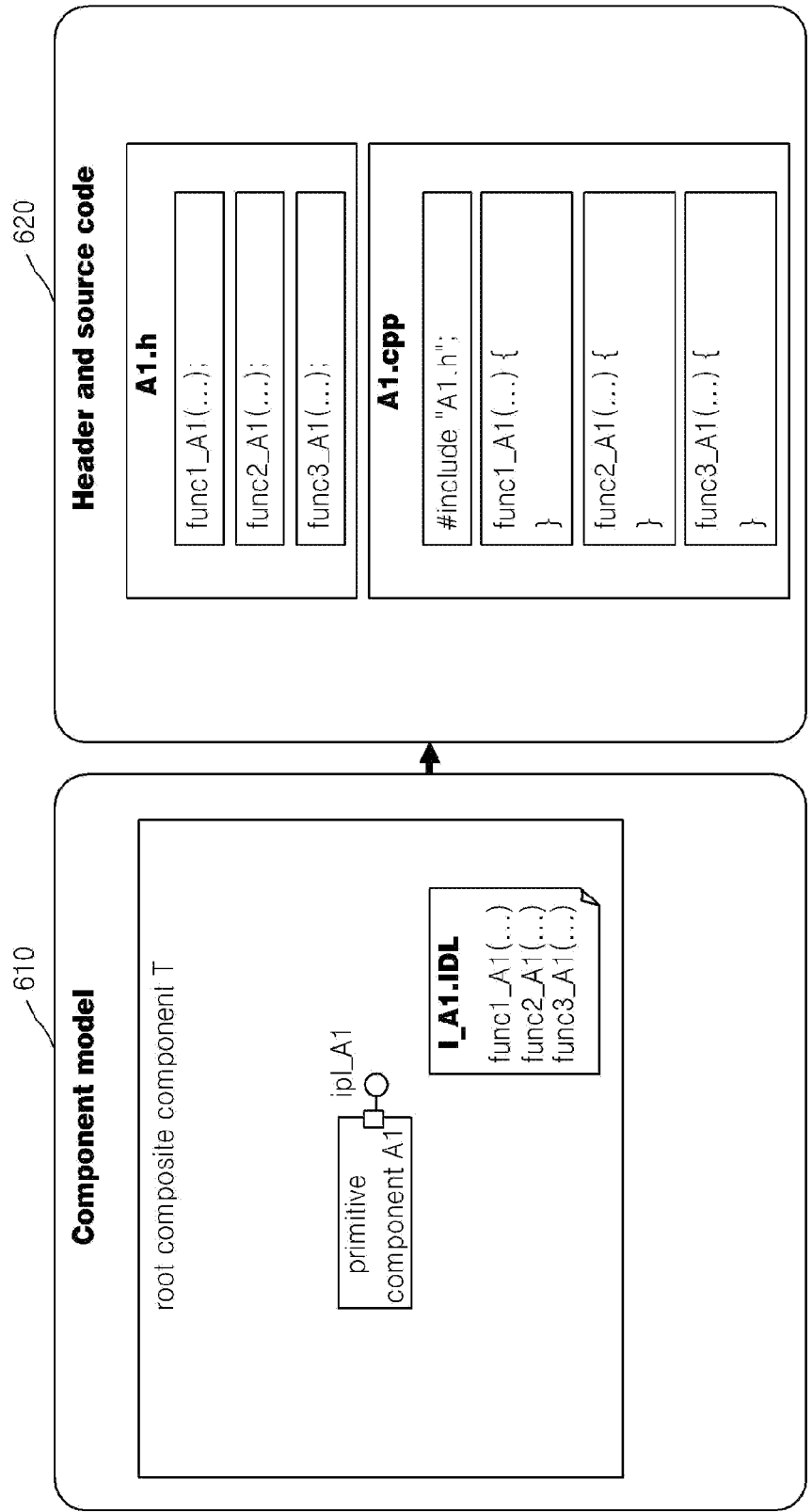
FIG. 6 is a diagram illustrating a template code implemented in a process of generating a virtual software platform, according to an embodiment of the present invention.

FIG. 6 is a diagram illustrating a template code implemented in a process of generating a virtual software platform, according to an embodiment of the present invention. When a directory structure corresponding to each component is generated, a template code implementing the function of the component is automatically generated at the same time inside each directory. These codes describe function sets of interface definition language (IDL) defining the function of a component as indicated by reference number 610. The template code of each component is formed as a pair of a header file and a source file as indicated by reference number 620. Basically, lists of function sets are arranged in the header file and empty syntactic blocks for implementing each function are arranged in the source file.

FIG. 6 illustrates an example of generating a template code for an A1 component. The A1 component provides an I_A1 interface defined in I_A1.IDL to include a function set of func1_A1, func2_A1, and func3_A1. In the template code, a header file (A1.h) includes three function lists according to interface definition, and a source file (A1.cpp) includes only a block for each function without actual internal implementation. In this case, generated template file lists are used as reference information for defining a BLC after that time.

Referring again to FIG. 5, in the BCDL and filelist for describing the BLC, a list of a header file and a source file for the BLC is included. This file list itself is maintained to be constant irrespective of changes in a directory structure, and only a relative path reflecting a directory structure is added in front of a file list.

Figure 7:
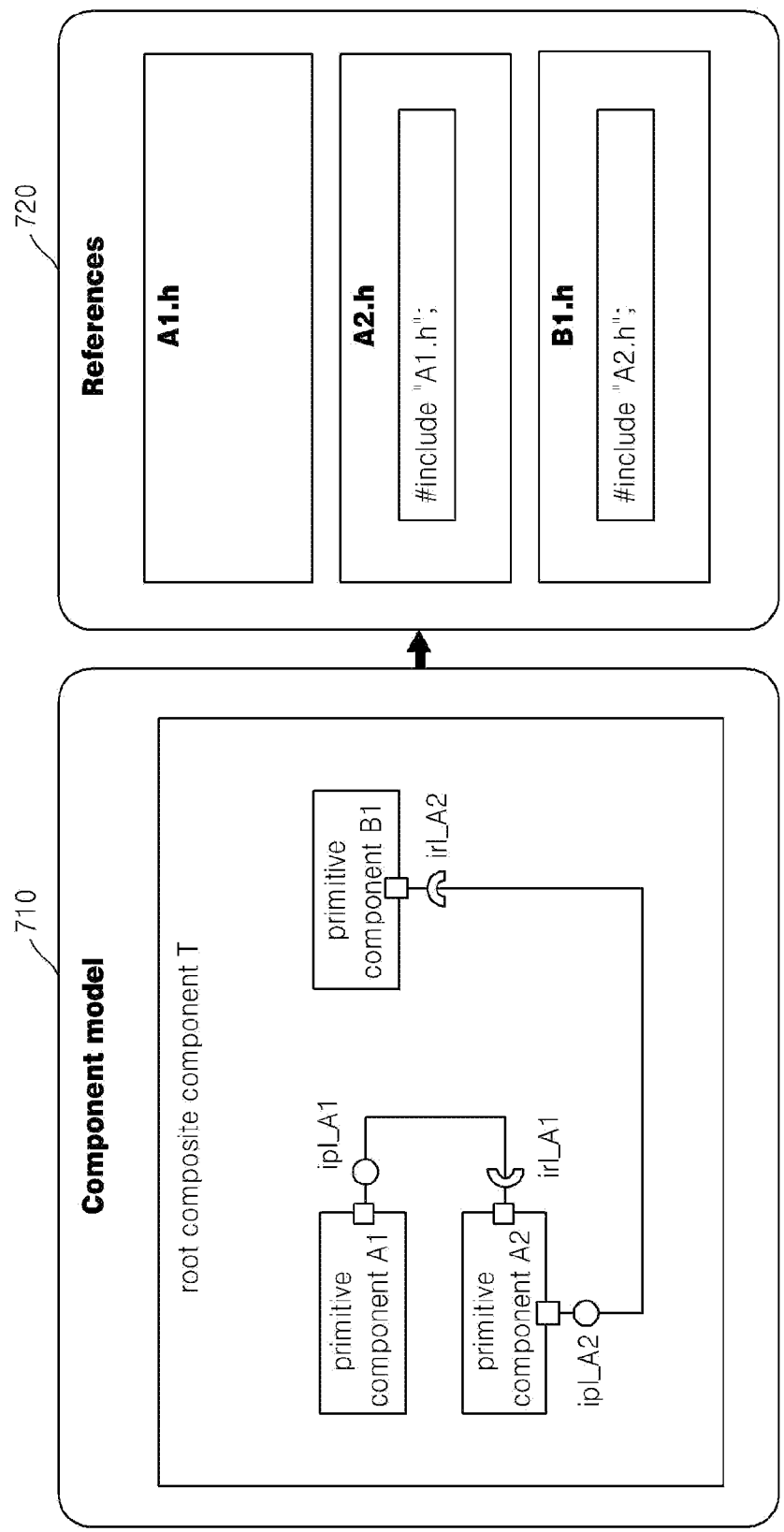
FIG. 7 is a diagram illustrating component dependency implemented in a process of generating a virtual software platform, according to an embodiment of the present invention.

FIG. 7 is a diagram illustrating component dependency implemented in a process of generating a virtual software platform, according to an embodiment of the present invention. Referring to FIG. 7, the dependency relationship indicated by reference number 710 expressed as a connection between a provide interface (ip) and a require interface (ir) appears as a reference of a header file and a function call in an actual code. That is, inside a source code of another component using the function of a predetermined component, a reference to the header file of the object component and a call for the function are included as indicated by reference number 720.

FIG. 7 illustrates the inside of a template code of components having a reference relationship. As can be seen, an A2 component requests an I_A1 interface provided by an A1 component, and a B1 component requests an I_A2 interface.

Inside the template code of each component, the header file of a component that is an object of a reference is included by an "include" statement.

Figure 8:
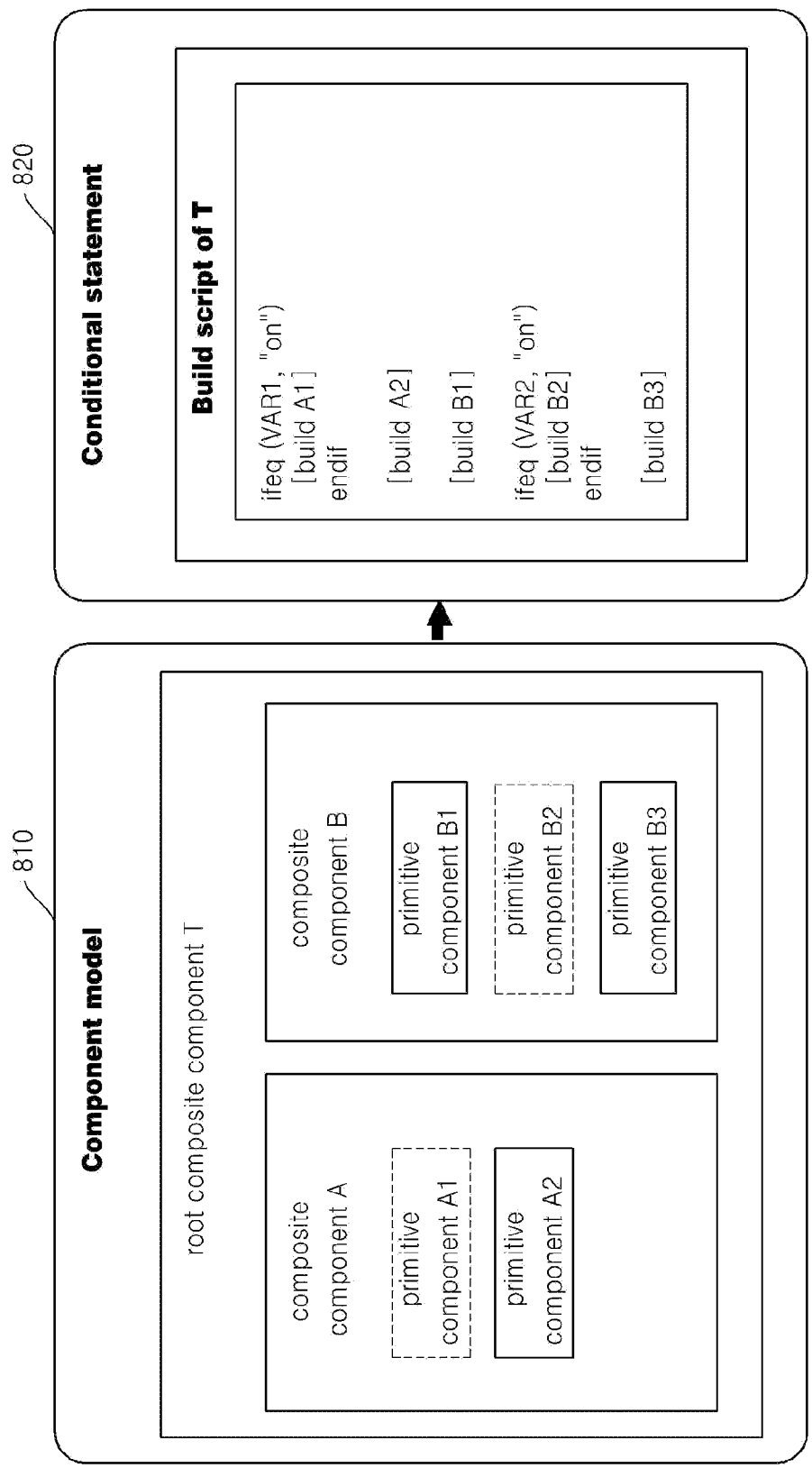
FIG. 8 is a diagram illustrating option variability implemented in a process of generating a virtual software platform, according to an embodiment of the present invention.

FIG. 8 is a diagram illustrating option variability implemented in a process of generating a virtual software platform, according to an embodiment of the present invention. According to aspects of the present invention, generation of a virtual platform based on a component model includes validating a software platform architecture by finally confirming whether an error occurs through building of template codes. For this, generation of a build script capable of performing a build job of a template code may be automatically performed.

In a component model, variability can be broken down to two types, an "option" and a "switch." The option variability indicates that a specified component may not be included in a component composition of software products according to a configuration value of a configuration variable as indicated by reference number 810. This can be processed by a method of removing the build path of a source code of the component through a build script. In order to apply the option variability, a conditional statement is included in a build script as indicated by reference number 820. As can be seen, FIG. 8 illustrates an example in which a configuration variable of a component model is applied so that the paths of components A1 and B2 for which options are configured can be controlled inside a build script.

Figure 9:
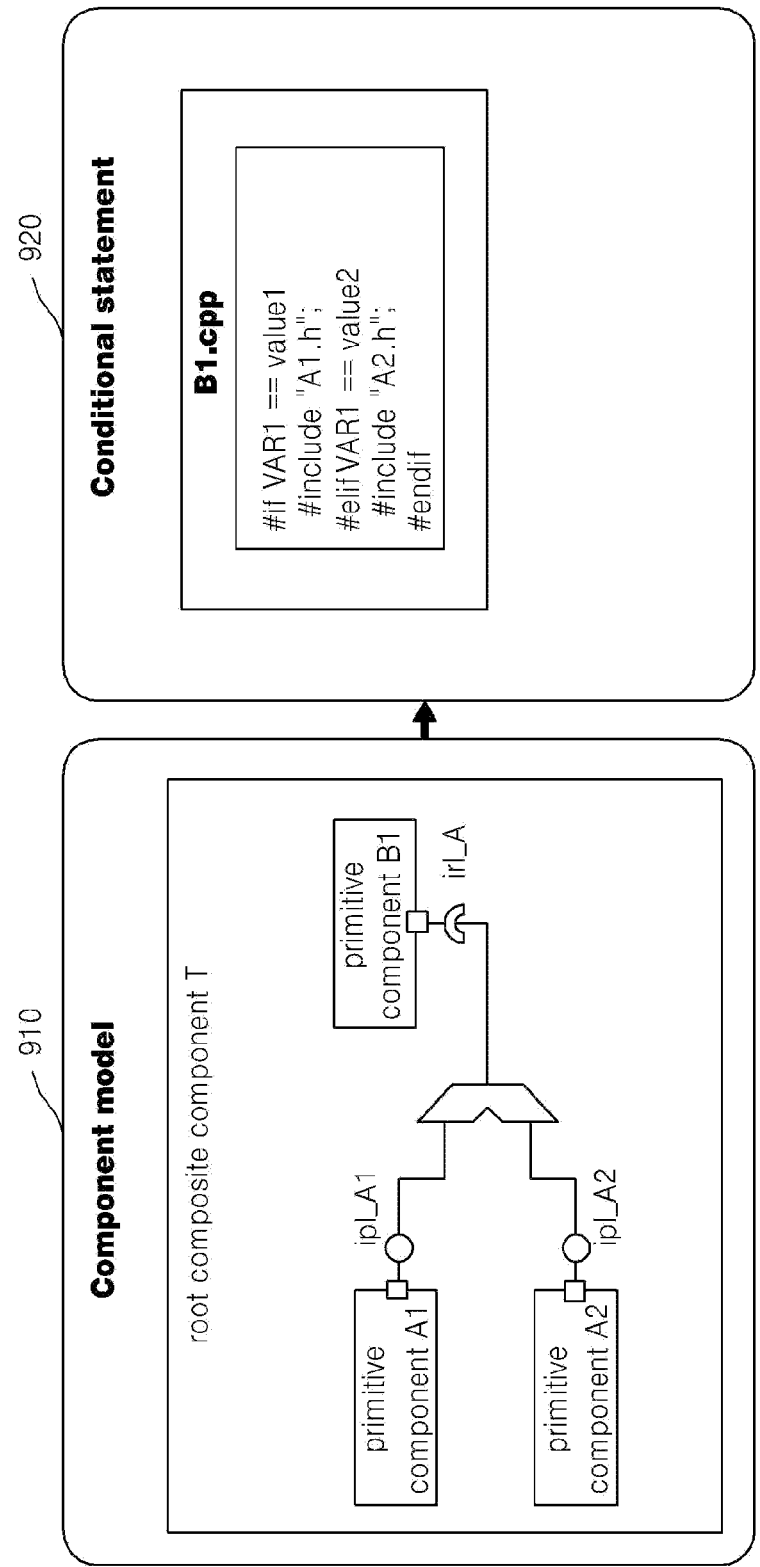
FIG. 9 is a diagram illustrating switch variability implemented in a process of generating a virtual software platform according to an embodiment of the present invention.

FIG. 9 is a diagram illustrating switch variability implemented in a process of generating a virtual software platform, according to an embodiment of the present invention. The switch variability is used to conditionally select one of a plurality of interfaces provided by two or more components and to connect the selected interface to a require interface as indicated by reference number 920. The interfaces and components that are not selected are not removed from the component composition construction only by the switch variability itself. That is, the components connected by a switch are all included in a component composition and, according to a configuration value of a configuration variable, only an interface that is actually used changes. Specifically, unless the option variability described above in FIG. 8 is separately specified, the components are not removed from a build script path as indicated by reference number 920.

FIG. 9 illustrates an example in which a template code for header files that are actually referred to by B1 is expressed in a construction in which switch-configured components A1 and A2 can be connected to a B1 component in a mutually exclusive manner. It is assumed that the connections are possible as the interfaces of ipl_A1 and irl_A are compatible with each other, and the interfaces of ipl_A2 and irl_A are also compatible with each other.

Figure 10:
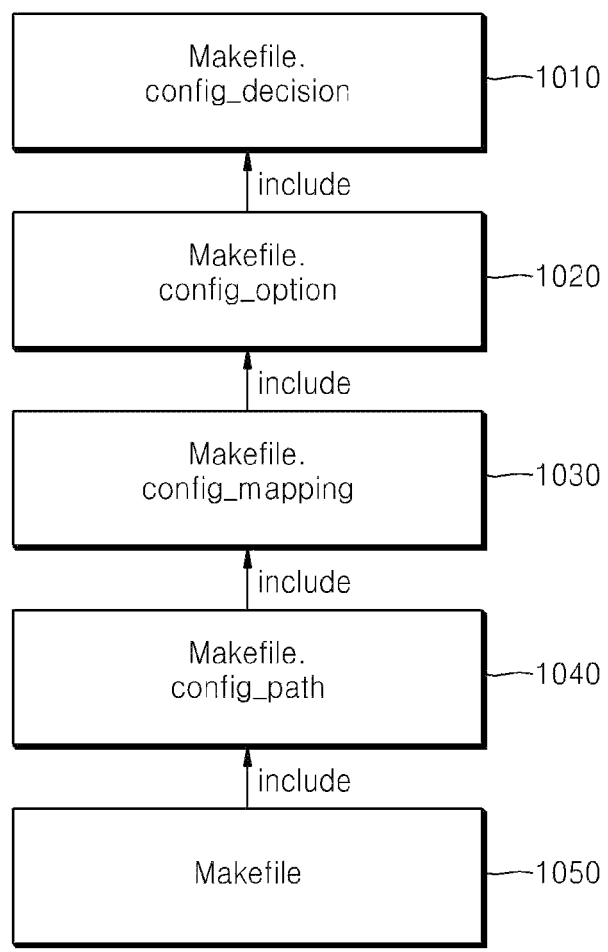
FIG. 10 is a diagram illustrating a structure for generating a build script implemented in a virtual software platform, according to an embodiment of the present invention.

FIG. 10 is a diagram illustrating a structure for generating a build script implemented in a virtual software platform, according to an embodiment of the present invention. As described above, a conditional statement is included in a build script in order to apply option variability. The hierarchical structure of the generation of an entire build script is as illustrated in FIG. 10. In a component model for a software platform, upper-level configuration variables can perform configuration jobs as a proxy through a mapping relationship with lower-level configuration variables. Jobs of configuring configuration variables for each software product and mapping between an FLC and a BLC are described in a product configuration language (PCL). In terms of a software product line (SPL), an upper-level configuration variable of a component model for a software platform can be treated as a software product type or model type.

As illustrated in FIGS. 11 through 16, each generation of a build script reflects the structural characteristics of a component model, and includes config_decision, config_option, config_mapping, config_path and a build script for each component. The detailed construction of a makefile will now be explained in detail with reference to various embodiments. A makefile is a starting point for beginning an entire build process, and describes a top-level path of a build path and position information of a build outcome.

Referring to FIG. 10, makefile.config_decision 1010 performs a decision point role capable of selecting a configuration value of a top-level configuration variable. Makefile.config_option 1020 performs a role of describing a set of configuration values of items directly classified as characteristics of a product from among configuration variables in mapping relationships with a top-level configuration variable. Makefile.config_mapping 1030 performs a role of describing configuration values of bottom-level configuration variables according to the mapping relationships with all other configuration variables in a component model, and describing together whether primitive components are composited. Makefile.config_path 1040 performs a role of describing path information of a source code of all components in a corresponding software platform. A composite component has a construction recursively calling a build script (makefile 1050) for lower-level components. Conversely, a primitive component has a build script construction describing a build process for the source code of the primitive component.

As will be explained below with reference to FIGS. 11 through 16, each of the build scripts described above can identify a variable and configuration information used for execution by referring to an upper-level build script in order of reference numbers 1010 through 1050 in FIG. 10. In the case of makefile, the makefile refers to a preceding makefile by using an "include" statement.

Figure 11:
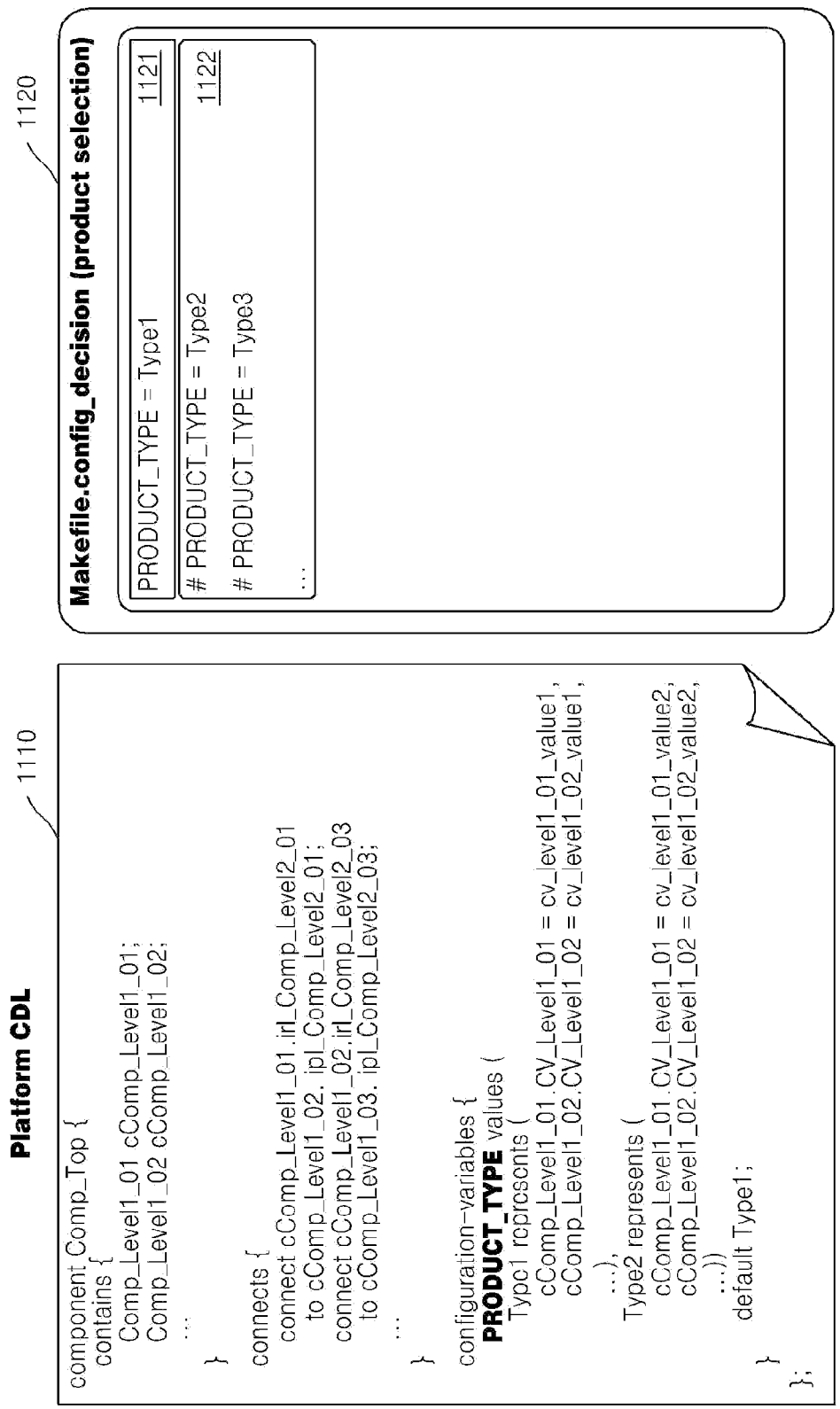
FIG. 11 is a diagram illustrating a structure of makefile.config_decision, which is a build script for selecting a software product, according to an embodiment of the present invention.

FIG. 11 is a diagram illustrating a structure of makefile.config_decision 1010, which is a build script for selecting a software product, according to an embodiment of the present invention. Referring to FIG. 11, an example makefile.config_decision 1120 can select and describe a type of a corresponding product so that a composition of components for a predetermined software product can be executed from a software platform. A component model containing software platform design information is described as a CDL 1110 of a top-level component. A variable PRODUCT_TYPE having a footnote 1121 classifies values of lower-level variables whose configuration values vary according to a software product, and links the values. An execution line having a footnote 1122 is added in makefile.config_decision 1120 according to the list of values that the PRODUCT_TYPE variable can have, and a default value configured as the PRODUCT_TYPE variable is added as an execution line having no footnote 1.

FIG. 12 is a diagram illustrating a structure of makefile.config_option 1020, which is a build script for configuring a software product, according to an embodiment of the present invention. Referring to FIG. 12, an example makefile.config_option 1220 describes a configuration list of lower-level variables linked to each value of PRODUCT_TYPE included in a CDL 1210 of the top-level component. In this case, an execution line for configuring a macro is added as 1224 and, in this stage, a macro reflecting a configuration value of PRODUCT_TYPE is declared. A macro is a mechanism of an operating system that can be declared in a build script and can be referred to and utilized inside a source file. By referring to the makefile.config_decision at footnote 1221, 1224 can confirm which PRODUCT_TYPE (as indicated by footnotes 1222 and 1223) is selected.

FIG. 13 is a diagram illustrating a structure of makefile.config_mapping 1030, which is a build script for mapping a configuration variable, according to an embodiment of the present invention. Referring to FIG. 13, an example makefile.config_mapping 1320 is distributed to lower-level components 1310 included in a top-level component and describes a configuration value according to the mapping relationship between other configuration variables. 1321 is included to refer to configuration values determined in the previous makefile.config_option. 1322 and 1323 show constructions of configuration variables generated for a composite component and a primitive component, respectively. In the same form as a CDL construction, 1322 specifies values that a lower-level (Level2) has according to a configuration value of an upper-level (Level1) configuration variable. The mapping relationship of configuration variables for composite components in a software platform are described by this method. 1323 shows a configuration variable for variability adjustment of a primitive component that is to be positioned at the bottom level and a macro configuration according to the configuration value. Variability for a component may be obtained by expanding option variability for expressing whether a component is involved in a composition process. In this manner, whether a primitive component in a lower level is included through a relationship between a hierarchical structure and a configuration variable can be determined. If a primitive component is included, in the case of a configuration value corresponding to the primitive component, a macro is declared as 1324, and can be referred to inside a source file and be utilized. In this case, a "DEFINE" variable uses "+=" in order to accumulate and include macros.

FIG. 14 is a diagram illustrating a structure of makefile.config_path 1040, which is a build script for a component build path, according to an embodiment of the present invention. Referring to FIG. 14, an example makefile.config_path 1410 specifies a path in which an actual source code of each component is positioned. 1411 is included in order to refer to the previous makefile.config_mapping 1030. 1412 specifies a compiler of an operating system for building a source code, and 1413 describes a path in an actual system in which the top-level component is to be positioned, and path information used for a build process. 1414 shows a construction of path information of a composite component, and a library file list that is to be finally built and generated is also configured automatically so that whether the list is included can be determined according to a configuration of a configuration variable. Also, in this case, "+=" is used in order to accumulate and include libraries of a lower-level component. 1415 shows a construction of path information of a primitive component. These path information items are used inside the individual makefile of each of a plurality of composite components and primitive components, and provides position information.

FIG. 15 is a diagram illustrating a structure of a makefile 1050 of a composite component, according to an embodiment of the present invention. Referring to FIG. 15, an example composite component 1510 of an upper level (Level1) is automatically constructed so that whether the makefile of the component is to be called can be determined according to configured values of configuration variables of components included in a lower level (LevelN). 1511 is included in order to identify the position path of source codes that are objects of build. 1512 is made to include an ordinary "all" build target as a basic entry path of a makefile, and actually indicates a build target identical to the component name of 1513. 1514 is a build target to remove generated library files.

FIG. 16 is a diagram illustrating a structure of a makefile 1050 of a primitive component, according to an embodiment of the present invention. Referring to FIG. 16, an example of a primitive component 1520 includes makefile.config_path in order to refer to path information in 1521. In 1522, the component forms a path in order to refer to a source file list and a header file existing in the path of the component. In 1523, a library file is generated, and in 1524, an execution line for removing a library file is constructed.

FIG. 17 is a diagram illustrating a call graph integrity check code according to an embodiment of the present invention. Referring to FIG. 17, in a source code file of a component, a function call code is automatically included according to other function information called by each function set inside a provide/require interface. That is, according to the link relationship between each component specified in a component model design stage and other function lists called by each function, as indicated by reference number 1710, a call statement for a function call is included in a corresponding function inside a source file as indicated by reference number 1720. Together with this, each function includes a call graph integrity check code 1720 for providing call traceability when the function is called. A syntax form of each function includes a component in which the function itself is defined and the name of the function. Accordingly, after configuring and building a software platform, the result of performing an integrity check code for functions called by each function during runtime is accumulated and compared with design information.

FIG. 18 is a diagram illustrating a call graph integrity check table according to an embodiment of the present invention. Referring to FIG. 18, based on components in a software platform and a function list that each component is to have, lists of other functions that each function will call are arranged. If a called function calls another function, tracking is performed once again at the position of the component and function in the list. Due to different component constructions and variability of each software product, the list of function calls confirmed for each product may vary. A basic form of a call graph is defined from software platform design information and if a call occurs from a position different from a position designed according to a tracking path when a virtual platform is executed, a call integrity error is generated.

A process of generating a virtual platform from software platform architecture design information will now be explained according to each element of virtual platform generation described above. First, components, interfaces, connections, and variability elements included in a component model are analyzed by component handlers, interface handlers, connection handlers, and variability handlers, respectively. Then, generation jobs are performed sequentially from a top-level component to bottom-level primitive components. For a composite component, only a directory having the same name as the component is generated. For a primitive component, a template source code together with a component directory is generated.

When a configuration variable for variability is specified in a corresponding component, a conditional statement is added. After a source file job is executed, a build script is generated. If template source codes for components are generated, generation of a virtual platform is completed.

In particular, a process of generating a build script in the process of generating a virtual platform described above will now be explained in detail. First, list information of a software product is identified from a component model. According to the identified software product list information, configuration lines of all products are added inside makefile.config_decision script. In this case, adding a footnote for a "default" item in the list information is removed so that the item can operate as a priority selection item when a build is executed. Configuration variables of each product type are described for each product in a makefile.config_option script. In a makefile.config_mapping script, configuration values of lower-level configuration variables in mapping relationships with each configuration variable in a makefile.config_option script are described. A Makefile.config_path script for describing position information of a source code of each component is generated. Finally, for a composite component, a build script that is constructed to include a build script for a lower-level component is generated and, for a primitive component, a build script that is constructed for building the primitive component is generated.

After the virtual platform is generated as described above, a process of configuring the virtual platform in order to make up a software product by using the platform is performed. Specifically, the process of configuring the virtual platform configures the virtual platform, generated according to software platform design information, to a variety of compositions according to design constructions, and determines whether each software product construction can be normally achieved.

A software platform is a set of components that are elemental parts of a variety of software products, and software products having different constructions can be generated as compositions of the components through configuration of constructions of a software platform. Inside a template source code of the generated virtual platform and build scripts, configuration variables for different configurations for respective software products are applied. By changing configured values of these configuration variables and by confirming the build and execution results according to the change, error detection and validation of appropriateness of software platform design information can be performed.

A process of performing validation of a component model for software platform architecture design information can be explained as follows. First, configuration and building of each software product that can be generated from a corresponding software platform is performed. If building is performed, configuration variable link information between each of the makefiles and source code paths are identified, and configuration of a corresponding software product is performed. Software corresponding to the build result is executed, and a function call flow is tracked and recorded. If a component list and function call flow identical to design are confirmed, the design information of the software product is regarded as validated. Validations for the rest of the product types are sequentially performed, and if all product types are identical to design information, the component model design of the software platform is formed without error.

According to aspects of the present invention, a method and apparatus for validating a software platform architecture of the present invention has the following advantages. In validation of a software platform design integrating a variety of software products, aspects of the present invention provide a technology capable of automating generation and validation of a virtual platform from design information included in a component model. Accordingly, validation can now be performed in relation to a software platform architecture and is no longer limited to a test after implementing an individual code for software. Also, a software platform is a collection of huge pieces of source codes, build scripts, libraries and a combination of elements, and a component model provides a method enabling development of a software product corresponding to a specific requirement. Structural information of a software product is described by using a component model, and whether a normal composition of the software product can be built is validated in advance, thereby reducing required test costs and manpower. Further, a virtual platform is generated from a component model that is software platform design information, and the virtual platform is suited for actual implementation, thereby maximizing synchronization and accuracy in implementation of software. Moreover, by linking major software design tools, a validation function of a software platform that is difficult to manage in a software development process based on the conventional unified modeling language (UML) can be secured.

Meanwhile, aspects of the present invention described above can be written as computer programs and can be implemented in general-use digital computers that execute the programs using a computer readable recording medium. Also, the data structure used according to aspects of the present invention described above can be recorded on a computer readable recording medium through a variety of ways. Examples of the computer readable recording medium include magnetic storage media (e.g., ROM, floppy disks, hard disks, etc.), and optical recording media (e.g., CD-ROMs, or DVDs). Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of generating a virtual software platform based on a component model, the method comprising:
   generating, by a processor, a template code of the virtual software platform, the generated template code describing functions of one or more components of software according to received design information of a software platform; and
   generating, by the processor, a build script of the virtual software platform, the generated build script comprising configuration variables according to a type of the software, wherein the configuration variables comprise at least one of a component that is optionally included in the software based on a condition, and a switch that selects an output from among a plurality of components based on another condition; and
   building, by the processor, the generated template code using the generated build script.

2. The method as claimed in claim 1, wherein the generating of the template code comprises:
   generating a directory structure implemented in the generating of the virtual software platform, the generated directory structure indicating an inclusion relationship between an upper-level one of the components and a lower-level one of the components;
   applying a dependency element indicating a dependency relationship between an interface of a first one of the components and a second one of the components using the interface; and
   applying a variability element configured to select a plurality of the components in the inclusion relationship or the dependency relationship according to the configuration variables.

3. The method as claimed in claim 2, wherein the generated directory structure is a hierarchical directory structure comprising a bottom-level component having a separate lower-level directory for a header file and a source file.

4. The method as claimed in claim 2, wherein a source code of the second one of the components comprises a reference to a header file of the first one of the components and a call to a function corresponding to the interface of the first one of the components.

5. The method as claimed in claim 2, wherein the generating of the build script comprises:
    defining a type variable to select the type of the software;
    describing a lower-level one of the configuration variables linked to the type variable;
    specifying a configuration value according to a mapping relationship between the configuration variables; and
    configuring path information of a source code of each of the components.

6. The method as claimed in claim 5, wherein the specifying of the configuration value comprises distributing the configuration value to lower-level ones of the components.

7. The method as claimed in claim 5, wherein the generating of the build script further comprises adding a conditional statement in the build script in order to apply the variability element.

8. The method as claimed in claim 7, wherein the variability element is one of an option variability configured to remove a first predetermined one of the components from a path of the build script and a switch variability configured to select a second predetermined one of the components according to a configured value of one of the configuration variables.

9. The method as claimed in claim 8, wherein the generating of the build script further comprises:
    for a composite component, constructing the build script so that a build script for the lower-level one of the components can be recursively called; and
    for a primitive component, constructing the build script so that a build process for the source code of the primitive component can be described.

10. An apparatus for generating a virtual software platform based on a component model, the apparatus comprising:
    a code generator configured to generate a template code of the virtual software platform, the template code being configured to describe functions of one or more components of software according to received design information of a software platform;
    a build script generator configured to generate a build script of the virtual software platform, the build script comprising configuration variables according to a type of the software and being configured to build the generated template code, wherein the configuration variables comprise at least one of a component that is optionally included in the software based on a condition, and a switch that selects an output from among a plurality of components based on another condition; and
    one or more processing devices configured to implement the code generator and the build script generator.

11. The apparatus as claimed in claim 10, wherein the code generator is further configured to:
    generate a directory structure implemented in the generating of the virtual software platform, the generated directory structure indicating an inclusion relationship between an upper-level one of the components and a lower-level one of the components;
    apply a dependency element indicating a dependency relationship between an interface of a first one of the components and a second one of the components using the interface of the first one of the components; and
    apply a variability element configured to select a plurality of the components in the inclusion relationship or the dependency relationship according to the configuration variables.

12. The apparatus as claimed in claim 11, wherein the generated directory structure is a hierarchical directory structure comprising a bottom-level component having a separate lower-level directory for a header file and a source file.

13. The apparatus as claimed in claim 11, wherein a source code of the second one of the components comprises a reference to a header file of the first one of the components and a call to a function corresponding to the interface of the first one of the components.

14. The apparatus as claimed in claim 11, wherein the build script generator is further configured to:
    define a type variable to select the type of the software;
    describe a lower-level one of the configuration variables linked to the type variable;
    specify a configuration value according to a mapping relationship between the configuration variables; and
    configure path information of a source code of each of the components.

15. The apparatus as claimed in claim 14, wherein the build script generator is further configured to specify the configuration value by distributing the configuration value to lower-level ones of the components.

16. The apparatus as claimed in claim 14, wherein the build script generator is further configured to add a conditional statement in the build script in order to apply the variability element.

17. The apparatus as claimed in claim 16, wherein the variability element is one of an option variability configured to remove a first predetermined one of the components from a path of the build script and a switch variability configured to select a second predetermined one of the components according to a configured value of one of the configuration variables.

18. The apparatus as claimed in claim 17, wherein:
    for a composite component, the build script generator is further configured to construct the build script so that a build script for the lower-level one of the components can be recursively called; and
    for a primitive component, the build script generator is further configured to construct the build script so that a build process for the source code of the primitive component can be described.

19. A non-transitory computer readable recording medium encoded with a computer program for executing the method of claim 1, and implemented by at least one computer.

* * * * *